United States Patent

Knapp

[11] Patent Number: 6,045,118
[45] Date of Patent: Apr. 4, 2000

[54] FAUCET CARTRIDGE HAVING A PLANE SHUTTER MEMBER

[76] Inventor: Francesco Knapp, Via Giacomo Leopardi 28, I-27061 Cava Manara (Pr. of Pavia), Italy

[21] Appl. No.: 09/171,815
[22] PCT Filed: Mar. 9, 1998
[86] PCT No.: PCT/EP98/01416
§ 371 Date: Oct. 27, 1997
§ 102(e) Date: Oct. 27, 1998
[87] PCT Pub. No.: WO98/40650
PCT Pub. Date: Sep. 17, 1998

[30] Foreign Application Priority Data

Mar. 12, 1997 [IT] Italy .................. TO97A0197

[51] Int. Cl.[7] .................................................. F16K 31/44
[52] U.S. Cl. .......................................... 251/231; 251/213
[58] Field of Search .................................. 251/231, 213, 251/149.1, 149.3, 238, 236, 237

[56] References Cited

U.S. PATENT DOCUMENTS 3,598,364 8/1971 Grenier ..................................... 251/231

FOREIGN PATENT DOCUMENTS

| 0 146 480 | 6/1985 | European Pat. Off. . |
| 0 416 294 | 3/1991 | European Pat. Off. . |
| 1 918 622 | 11/1969 | Germany . |
| 23 59 312 | 4/1977 | Germany . |
| 81 33 306 | 4/1982 | Germany . |

*Primary Examiner*—David J. Walczak
*Attorney, Agent, or Firm*—Young & Thompson

[57] ABSTRACT

A cartridge for a one-way hydraulic faucet of the type having a plane shutter member includes a cartridge body having a bottom portion with a hollowed cylindrical seat housing a sleeve packing provided with elastic pushing elements; the plane shutter member is formed by a slide which is guided within the cartridge body for diametrical movement with respect to the body, is kept in operative contact with the sleeve packing, and shows an opening suitable for registering, in a position of the slide, to the passage of the sleeve packing, whereas the slide, in another position, closes that passage; and the slide is kinematically coupled to an inner arm of the lever, which is pivoted in the cartridge body and whose outer arm forms the control member of the faucet. The slide is manufactured of plastics and it may be provided with a thin sheet having a high resistance, in order to prevent its erosion.

5 Claims, 2 Drawing Sheets

FAUCET CARTRIDGE HAVING A PLANE SHUTTER MEMBER

BACKGROUND OF THE INVENTION

This invention refers to a cartridge for a one-way hydraulic faucet of the type having a plane shutter member.

DESCRIPTION OF THE PRIOR ART

The cartridges of the type taken into consideration have, in most cases, a rotary shutter member with an excentrical passage opening, which co-operates with a fixed seal packing and, under action of a rotary control member, is made to rotate between a position of complete opening and a position of complete closure, through intermediate positions of regulation of the delivery rate. The main drawback of this structure resides in that the travel from the complete opening and the complete closure covers a very limited angular field, whereby the control of the delivery rate is difficult for the user and is little sensitive, because it needs to be done by means of very limited angular displacements.

There are also known cartridges of the type taken into consideration, wherein two plates of ceramic material are installed, the one, unmovable, being provided with an inlet opening and an outlet opening, and the other being movable in translation under action of a tilting control lever, and being provided with a channel intended to connect the passage openings of the unmovable plate. In this case, by choosing a suitable ratio between the arms of the control member, it is possible to render the control sensitive enough. However a drawback of these cartridges, which are of the closed type, resides in that the presence of two passage openings in the unmovable plate needs that these openings are disposed in an eccentric manner, and this involves providing complicated passageways in the faucet body for which the cartridge is intended. Moreover, the manufacture of such a cartridge is expensive due to the use of plates of ceramic material.

SUMMARY OF THE INVENTION

Therefore, the object of this invention is to find a remedy for all or a part of these drawbacks of the known cartridges, though preserving the respective advantages. More particularly, it is intended that the cartridge should afford an easy and sensitive control, that its manufacture cost should be limited, that its duration in use should be satisfactory, and that no complicate shape should be needed for the faucet body in order to allow installing the cartridge.

This object is attained, according to the present invention, in a cartridge for a one-way hydraulic faucet of the type having a plane shutter member, in that: the cartridge includes a cartridge body having a bottom portion wherein there is hollowed a cylindrical seat housing a sleeve packing provided with elastic pushing means; the plane shutter member is formed by a slide which is guided within the cartridge body for diametrical movement with respect to said body, is kept in operative contact with said sleeve packing, and shows an opening suitable for registering, in a position of the slide, to the passage of said sleeve packing, whereas the slide, in another position, closes said passage; and said slide is kinematically coupled to an inner arm of a lever, which is pivoted in the cartridge body and whose outer arm forms the control member of the faucet.

Preferably, said slide is manufactured of a suitable plastic material.

Preferably, said sleeve packing is installed in the bottom portion of the cartridge body in a central position.

Thanks to these features, the control of the faucet may be rendered easy and sensitive by means of a suitable choice of the ratio between the two lever arms. Because the closure of the faucet is ensured by the sleeve packing, the slide does not need to be manufactured of an expensive material such the ceramics, on the contrary it may be made of a suitable plastics, whereby the manufacture of the cartridge is easy and cheap. Because such a cartridge is of the open type, the bottom of the cavity of the faucet body, intended to house the cartridge, only needs to have a passageway for water inlet, which moreover may be central, whereby there is no need for a complicated structure of the faucet body.

Preferably, said slide includes a thin protective sheet applied to its surface which co-operates with the sleeve packing. Said thin protective sheet may be of metal or it may be made of a synthetic material having high characteristics.

This way, the slide may be made of a particularly cheap plastics which, in view of its scarce characteristics, could not resist on the long time to the erosive action due to the water flow in the conditions of considerable throttle, but it is protected with respect to said erosive action by the thin protective sheet, which is made of a more expensive material but in view of its very little quantity does not have a considerable influence on the cartridge cost.

Preferably, the control lever is pivoted in the cartridge body by means of a spherical shape of an intermediate portion of the lever and a complementary shape of a seat in the cartridge body, a suitable packing being provided, preferably shaped as a so-called quadring.

BRIEF DESCRIPTION OF THE DRAWINGS

These and other features, objects and advantages of the subject of the present invention will appear more clearly from the following description of an embodiment being a non-limiting example, with reference to the appended drawings, wherein.

DESCRIPTION OF THE PREFERRED EMBODIMENT

Figure 1:
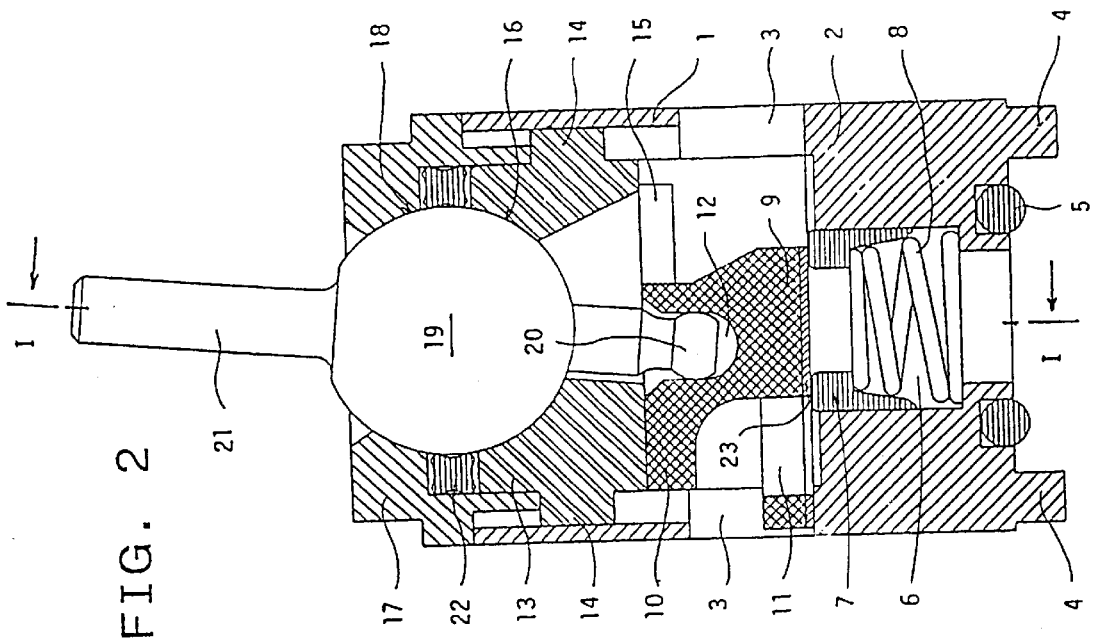
FIG. 1 shows the cartridge according to the invention in the closure position and in an axial cross section, transversal with respect to the direction of the slide movement, namely a section taken along line I—I of FIG. 2.

The cartridge comprises a body 1 which, in this case, is made of a single piece with a bottom portion 2, and wherein are made openings 3 for the delivery of the water controlled by the cartridge; this cartridge is, therefore, of an open type. The bottom portion 2 is provided with a packing 5 intended to seal with respect to a water inlet channel, and in the shown embodiment it has some pins 4 intended for establishing the position of the cartridge when it is inserted in a faucet body (not shown). Different positioning means may be foreseen in different embodiments of the cartridge. In the bottom portion 2 there is hollowed a cylindrical seat 6, wherein is installed a sleeve packing 7, made of an elastomeric material and pushed by a spring 8.

Figure 2:
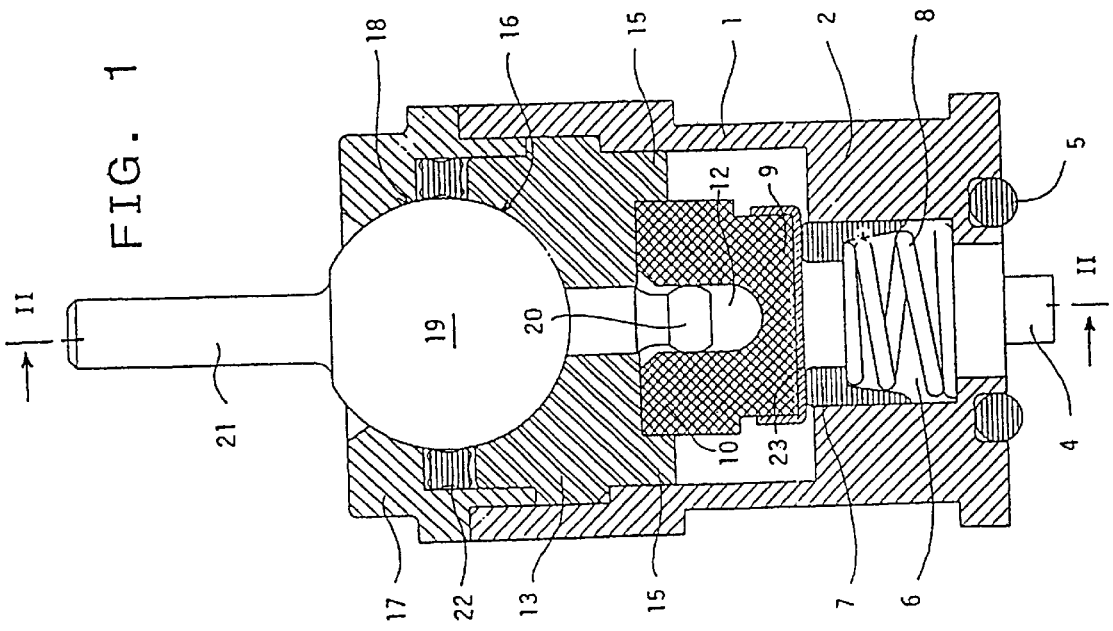
FIG. 2 shows the same cartridge in an axial cross section, longitudinal with respect to the direction of the slide movement, namely a section taken along line II—II of FIG. 1.
Figure 3:
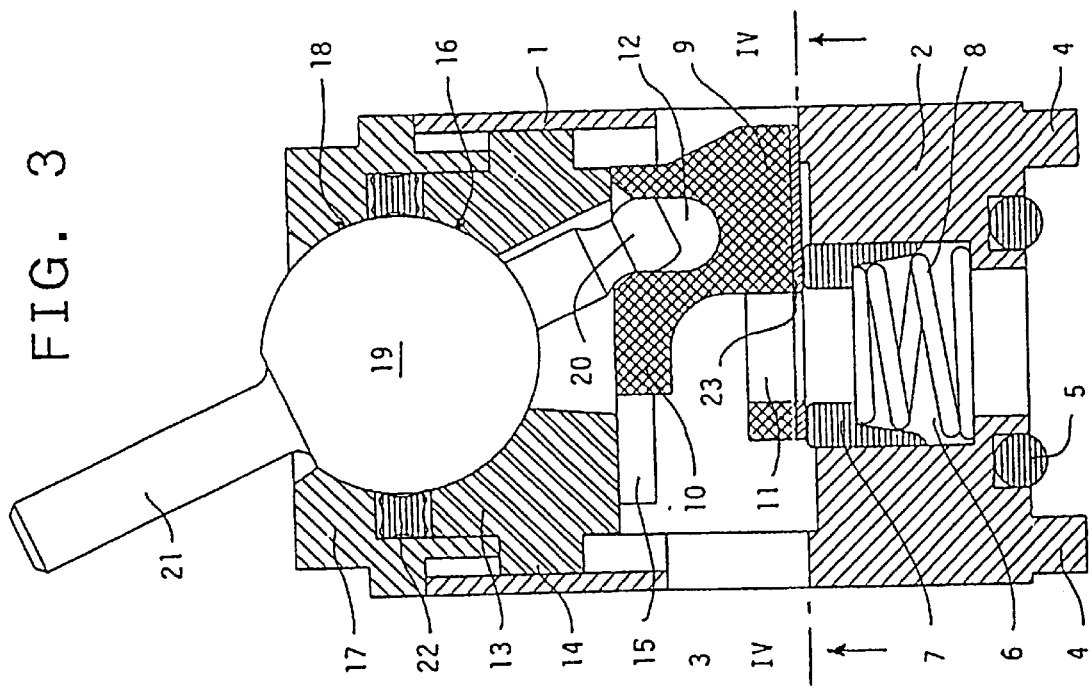
FIG. 3 shows the cartridge in a cross section corresponding to that of FIG. 2, but in the position of complete opening.
Figure 4:
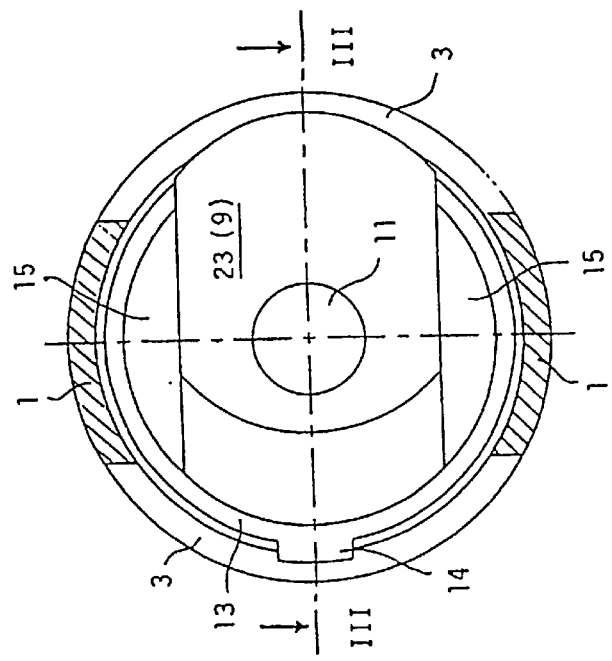
FIG. 4 shows a transversal cross section of the cartridge, taken along line IV—IV of FIG. 3.

In the cartridge body 1 is housed a plane shutter member having the shape of a slide, comprising a bottom part 9 with a passageway 11 and a top part 10 with a coupling seat 12. The passageway 11 is so disposed and sized that, in a position of the slide (FIG. 3: opening position) the passageway 11 registers with the passageway of the sleeve packing 7, whereas in another position of the slide (FIG. 2: closing position) the passageway 11 does not communicate with the passageway of the sleeve packing 7, whereby this latter is closed. As it may be understood, in the intermediate positions between the two described and shown, the passageway 11 registers only in part with the passageway of the sleeve packing 7, which therefore is not closed but is more or less throttled.

The slide 9-10 is axially kept in its position within the cartridge body 1 by means of an inner member 13, inserted in the body 1 and having tongues 14 which prevent its rotation. The inner member 13 is provided with projecting portions 15, and between these latter is mounted the top part 10 of the slide 9-10, which in this way is guided for a diametrical movement with respect to the body 1. Moreover the inner member 13 has, opposite the projections 15, a partially spherical seat 16.

On its turn, the inner member 13 is kept in its position within body 1 by a cover 17, which is mounted on body 1 in any way (for example by means of elastically snapping teeth, not shown, or by sticking or welding), which at its inner portion forms a partially spherical seat 18.

Between the partially spherical seats 16 and 18 there is seated the partially spherical intermediate portion 19 of a two-arm lever, whose inner arm 20 is coupled with the coupling seat 12 of the slide 9-10, whereas the outer arm 21 (usually provided with a lever, cap or handle, not shown) forms the control member for the faucet. A seal packing 22, for example of the type called "quadring", seals among the spherical portion 19 of the control lever and the spherical portions of the cover 17 and the inner member 13, respectively. In the shown embodiment, packing 22 is mounted in equatorial position with respect to the partial sphere 19, but in other embodiments it could be situated in different manners. As it may be understood, by causing the control member 21 to tilt, the slide 9-10 is caused to displace diametrically and therefore the flow traversing the faucet is controlled.

When the passageway 11 of the slide 9-10 closes in an about complete manner the passageway of the sleeve packing 7, the water flow is highly throttled and it assumes a great speed and erosive capacity, which is applied to the rims of passageway 11. In order that these rims are not damaged, the slide 9-10 may be manufactured of a high quality plastics, such as those based on polysulfones. However such plastics are somewhat expensive. Therefore, in certain cases it is preferable to use for the slide 9-10 a cheap plastics, and provide its surface intended to co-operate with the sleeve packing 7 with a thin sheet of a material 23 suitable for resisting to the erosion, fixed to the slide. This thin sheet may be made of a high quality plastics or, preferably, by a thin sheet of metal, for example stainless steel.

As it may be understood from the above, the cartridge according to the present invention collects together substantially all the advantages of the different types of known cartridges, by obviating most of their drawbacks; it is easy to use, has a considerable control sensitivity, is relatively cheap in manufacture and does not raise particular installation problems. Moreover it is easy to design the same in order to satisfy different installation requirements.

An advantage afforded by the cartridge according to the invention resides in that, particularly when its inlet opening is in a central position, it may be mounted in a body of simple shape, which may replace the usual screwed upper part of an existing faucet.

It should be realized that the invention is not limited to the embodiment which has been described and shown as an example. Some possible changes have been described, and other are within the skill of any technician. For example, the bottom part 2 of body 1 could be applied to the body instead of being integral therewith; the sleeve packing 7 may be mounted, when needed, in a non-central position; it may be pushed by an elastic member different from a spring, or even by its own elasticity; the shape of slide 9-10 may be chosen in various manners; its diametrical guidance within the cartridge body may be obtained in different manners; and the control lever may be pivoted in any manner different from a partially spherical intermediate portion.

These and other changes and any replacement by technically equivalent means may be introduced without departing from the spirit of the invention and the scope of this Patent.

I claim:

1. A cartridge for a one-way hydraulic faucet, comprising a cartridge body having a bottom portion;

a single cylindrical seat hollowed in a central position in said bottom portion of said cartridge body;

a sleeve packing having a passage; and an elastic pushing means for said sleeve packing, both said sleeve packing and said elastic pushing means inserted in said cylindrical seat;

a plane shutter member in the form of a slide, mounted and guided within said cartridge body for only diametrical movement with respect to said cartridge body, said slide being kept in operative contact with said sleeve packing and having a single opening suitable for registering, in a position of the slide, with said passage of the sleeve packing, whereas the slide, in another position, closes said passage; and a two-arm lever pivoted in said cartridge body, said lever having a first inner arm kinematically coupled to said slide, and a second outer arm forming a control member.

2. A faucet cartridge as set forth in claim 1, wherein said slide is manufactured of a plastic material and includes a thin protective sheet applied to the surface thereof for co-operating with said sleeve packing, said protective sheet being made of metal.

3. A faucet cartridge as set forth in claim 2, wherein said metal is stainless steel.

4. A faucet cartridge as set forth in claim 1, further comprising a cover, and wherein said control lever has a partially spherically shaped intermediate portion, said cartridge body has a seat whose shape is complementary to the shape of said intermediate portion of the lever, said intermediate portion of the lever being housed in said seat of the cartridge body, and a seal packing having a substantially square cross section being housed in said seat of the cartridge body and co-operating with said intermediate portion of the lever and with said cover.

5. A faucet cartridge as set forth in claim 1, wherein said cartridge body comprises an inner member mounted so as not to be allowed to rotate, said inner member having projecting portions forming a guide for said slide, and said cartridge body having a cover adapted to keep in their positions all parts of the cartridge, said seat for the intermediate portion of the control lever being formed in part by said inner member and in part by said cover.

* * * * *